United States Patent
Lederer

[15] 3,658,700

[45] Apr. 25, 1972

[54] METHOD FOR CONTROLLING AND INHIBITING THE FORMATION AND GROWTH OF SLIME IN INDUSTRIAL WATER SYSTEMS

[72] Inventor: Seymour J. Lederer, Fairlawn, N.J.

[73] Assignee: Muck & Co., Inc., Rahway, N.J.

[22] Filed: Sept. 25, 1970

[21] Appl. No.: 75,752

[52] U.S. Cl..................................210/64, 162/161, 424/311
[51] Int. Cl.........................................C02b 3/10, D21h 5/22
[58] Field of Search..................162/161; 210/64; 71/106, 66, 71/67; 424/311; 260/487

[56] References Cited

UNITED STATES PATENTS

| 2,581,852 | 1/1952 | Gilbert | 260/487 X |
|---|---|---|---|
| 2,723,909 | 11/1955 | Denny | 71/106 X |
| 2,876,255 | 3/1959 | Johnston | 260/487 |
| 2,925,435 | 2/1960 | Schwerdle | 260/487 |
| 3,084,094 | 4/1963 | Gertler | 424/311 |
| 3,021,256 | 2/1962 | Bollenback et al. | 162/161 |
| 3,151,020 | 9/1964 | Cruickshank | 162/161 X |

OTHER PUBLICATIONS

Gertler et al.: J. Agricultural and Food Chemistry, Vol. 6, pp. 843– 844, (Nov., 1958)

Primary Examiner—Reuben Friedman
Assistant Examiner—Thomas G. Wyse
Attorney—Frank M. Mahon, J. Jerome Behan and I. Louis Wolk

[57] ABSTRACT

Formation and growth of slime in paper mill water systems in controlled and inhibited by the use of benzyl bromoacetate.

6 Claims, No Drawings

METHOD FOR CONTROLLING AND INHIBITING THE FORMATION AND GROWTH OF SLIME IN INDUSTRIAL WATER SYSTEMS

This invention relates to a method for inhibiting the formation and growth of slime in industrial water systems. More particularly, this invention relates to a method for inhibiting the formation and growth of slime in paper mill white water systems by introducing into such paper mill water systems an antibacterial and antifungal quantity of benzyl bromoacetate.

Control and inhibition of the growth of microorganisms in industrial water systems and particularly in recirculating water systems, has long been recognized as a severe and difficult problem. These industrial waters often are rich in nutrient substances rendering them ideal media for the growth of microorganisms, particularly bacteria and fungi, the microorganisms most often associated with the formation and growth of slime in industrial waters. Further, conditions of temperature and pH imparted to such industrial process waters often provide an environment particularly suited to bacterial and fungal growth. Uncontrolled proliferation of microorganisms in industrial process waters can result in serious processing problems involving poor product quality, or even complete spoilage of product, together with excessive shutdown time and severe economic loss. Nowhere is the problem of control and inhibition of the growth of microorganisms in industrial process waters more burdensome than in the paper making industry wherein paper mill white waters are well suited to supporting growth of bacteria and fungi and, thus, are highly susceptible to formation of slime.

In general, the paper making process involves suspending fibers in water and leading this suspension, known as the stock, onto, and uniformly dispersing it over, a moving wire belt. The suspending water, known as the white water, is drained off through the meshes of the wire belt leaving deposited on the belt a fiber web which is led off at the opposite end of the wire belt and subjected to pressing and heat drying operations to form a paper sheet. The white water, which has passed through the wire belt, is collected and, in most modern mills, is recirculated to serve once more in formation of the fiber suspension. The water retained in the fiber web is evaporated (i.e. distilled) away during the drying operation and does not return to the system.

The fiber suspension usually is composed of groundwood fibers and/or chemical pulp fibers. Groundwood fibers are obtained by reducing wood to fibers by mechanical means with the aid of various grinders, shreaders and beaters. Chemical pulp fibers are obtained by subjecting wood to a cooking process in the presence of chemical agents designed to remove soluble entra and extra cellular components in the wood. Whatever the source of the fiber material, there are placed in circulation in paper mill water systems during stock preparation a variety of materials which can serve as nutrients for the growth of microorganisms. Such materials will include mineral salts, sugars, starch and hemicellulose together with a variety of special additive materials, such as vegetable gums, synthetic polymers, wet-strength resins and foam control chemicals, which may be employed in the manufacture of a particular type of paper. Bacteria will grow well in such paper mill water systems and fungi will grow usually at or just above the water level, where there is sufficient but not excessive moisture, and in areas of heavy stock accumulation where circulation is poor. Furthermore, paper mill waters generally are oxygenated and are at a temperature (usually between 20° to 65° C.) and at a pH (usually between 4 and 8) conducive to microbial growth.

The slime which causes problems in paper mills is formed by microorganisms, principally by bacteria and fungi. It is a stringy, pasty, gelatinous mass consisting of microorganisms and their secretions together with accumulations of fibers, silt deposits, dirt, dried pulp and scale. Many bacteria are associated with the formation of paper mill slime including both capsulated and non-capsulated, spore-forming and non-spore-forming bacteria of the genera *Aerobacter, Bacillus, Cellulomonas, Clonothrix, Crenothrix, Chromobacter, Gallionella, Leptothrix, Oidium* and *Torulae;* a bacteria very frequently associated with paper mill slime being *Aerobacter aerogenes*. Fungi frequently encountered in paper mill slimes include members of the genera *Mucor, Penicillium, Pyrenochaeta, Fusarium, Verticillium, Aleurisma, Geotrichum* and *Pullularia*.

The formation of slime in paper mill water systems leads to a variety of unfavorable effects perhaps the most striking of which include:

1. Breaks on both the wet and dry end of the paper machine due to the tendency of slime agglomerates to stick to the press or dryer rolls.
2. Slime agglomerates retained in the fiber web cause specks in the finished paper which adversely effect the appearance of the finished paper.
3. The presence of slime in the wet fiber web promotes plugging of wet felts on the press rolls requiring frequent cleaning and/or replacement.
4. Accumulations of slime in the fiber suspension will adversely effect the drainage rate of the fiber web on the wire belt necessitating slowing of the speed of the paper machine with consequent loss of production.
5. The presence of slime in the paper mill water system encourages the formation of deposits on the surface of all parts of the paper making machines resulting in the clogging of such parts as screens, conduits, pumps and suction boxes with resultant loss of performance.
6. Significant corrosion is likely to occur under slime deposits. Aside from effects on quality of the paper products produced, it is apparent, of course, that all of the unfavorable effects noted above lead to excessive shutdown time with consequent loss of production and increased production expense.

Although an important factor in controlling the formation of slime in paper mill water systems is good housekeeping, it has long been apparent that mill sanitation alone is of only partial value in the control of slime formation. One significant approach to the prevention of slime formation in paper mill water systems is through controlling the growth of microorganisms in such water systems by adding thereto chemical disinfectants. Since the medium to be disinfected is the paper mill water system, an effective agent for controlling the growth of microoraganisms therein should be one which (a) is effective in bactericidal and fungicidal action and does not suffer inactivation in paper mill water systems; (b) displays low toxicity to humans in normal conditions of use; (c) is relatively odorless and (d) is economical to use.

In addition to the characteristics noted above, an effective agent for controlling the formation of slime in paper mill water systems should be one which does not tend to become a part of the finished paper product during normal operation. Many of the antimicrobial agents which have been found to be highly effective in controlling the formation of slime in paper mill white water systems suffer the serious disadvantage of being incorporated, by deposition or other means, into the cellulosic or other fiber material being processed in the mill and are carried on the fiber web throughout the entire paper making operation into the finished paper product. In many cases, the toxicity thus imparted to the finished paper product renders it undesirable, and indeed wholly unsuited, to uses wherein the paper product comes into direct contact with the consumer or with food products. Although this problem is particularly severe where water insoluble toxicants are employed, the use of water soluble toxicants does not entirely eliminate the problem since many of these materials become incorporated into the finished paper product during the drying operation.

The instant invention is based upon applicant's discovery that effective control and inhibition of the formation of slime in paper mill water systems can be achieved by incorporating therein a bactericidally and fungicidally effective quantity of benzyl bromoacetate. Applicant has found that benzyl bromoacetate serves as an effective agent for controlling and inhibiting the formation of slime in paper mill water systems not only because of its pronounced bactericidal and fungicidal activity against those organisms commonly associated with slime formation in paper mill white water systems; its low toxicity to humans under normal use conditions in paper mill water systems; its relative lack of odor, and its economy when used in the low concentrations required for effective slime control, but also because benzyl bromoacetate shows no affinity for cellulosic or other paper making fibers and, though it is water insoluble, is substantially completely removed from the paper product being manufactured during normal pressing and drying of the fiber web leaving the finished paper product free of any induced toxicity. It is contemplated, therefore, that bactericidally and fungicidally effective amounts of benzyl bromoacetate will be added to paper mill water systems for controlling and inhibiting the formation of slime.

It is well-known that many bromoacetic acid esters are active antimicrobials. Such compounds, including for example 1-bromoacetoxy ethanol-2, bis-1,4-bromoacetoxy-2-butene and 5,5-bis-(bromoacetoxymethyl)-m-dioxane, have been suggested for use in controlling microbial problems caused by bacteria in industrial water systems including slime control in paper mills. Further, many bromoacetic acid esters are known to be highly effective fungicides and have been suggested for use as paint additives to control fungal problems.

Surprisingly, applicant has found that benzyl bromoacetate, unlike other bromoacetic acid esters, is unique in its ability to codistil with water over the entire pH range normally encountered in the paper making process. This property of benzyl bromoacetate insures that any benzyl bromoacetate carried in the wet fiber web is substantially completely distilled from the web during the normal pressing and drying operation and does not become incorporated into the finished paper product. Thus, the use of benzyl bromoacetate in paper mill water systems not only assures effective control and inhibition of slime formation but allows the preparation of paper products free of any induced toxicity which might prove harmful to humans.

The efficiency of benzyl bromoacetate, as compared with other members of this series in codistilling with water is illustrated in the following experiment wherein several esters of bromoacetic acid were codistilled with water at pH 4,5,7 and 8.5 to determine the amount of ester that would codistill unchanged under the conditions of distillation.

The procedure consisted of mixing 5.0 gm of the ester with 495.0 gm of water in a distillation flask with boiling stones. The pH of the mixture was adjusted either with alum or sodium hydroxide to the appropriate value and then maintained at this pH throughout the subsequent distillation. The distillate was collected into a Dean-Stock Trap and analyzed for ester content. The percentage of ester recovered in the distillate is shown below.

| Ester | % Ester Recovered | | |
|---|---|---|---|
| | pH 4.5 | pH 7 | pH 8.5 |
| Benzyl bromoacetate | 100 | 100 | 80 |
| Bis-1,4-bromoacetoxy-2-butene | 7.3 | 25 | 11 |
| Ethyl bromoacetate | 100 | 85 | 18 |
| Phenyl bromoacetate | 100 | 79 | 5 |
| Phenylpropyl bromoacetate | 100 | 62 | 12 |
| Bromoacetic acid | — | 3.1 | — |

It is, of course, apparent from the results that benzyl bromoacetate codistills with water much more efficiently over a wider pH range than the other bromoacetic acid esters tested (bromoacetic acid was included in the experiment to check on its ability to codistill at a neutral pH — the low recovery shows that it does not codistill significantly). These residue studies confirm that in the paper mill the final sheet prepared in the presence of benzyl bromoacetate will be free of toxicant which will then not be available for contact with humans or for extraction into food or food products.

In order to control and inhibit the formation and growth of slime in paper mill water systems, benzyl bromoacetate may be added to the system either neat or in a variety of formulations depending upon the requirements of the particular system involved. Since slime formation and growth depend upon a variety of factors including presence of slime producing bacteria and fungi, presence of nutrient materials, water temperature and pH, and since these conditions will vary from point to point and from time to time within a given mill system as well as in different mills, it is apparent that the best mode of carrying out the process of this invention will vary considerably as to quantity of material required and as to point of addition.

In general, effective control and inhibition of the formation of slime is achieved by adding to the paper mill water system sufficient benzyl bromoacetate to provide a concentration of from about 0.1 to 25.0 ppm based on the total system volume with concentrations between 0.1 to 10.0 ppm being generally preferred. In mills having severe slime formation problems, much higher concentrations (i.e., as high as 1,000 ppm) can be employed. Of course, where only minor slime problems are involved, lesser concentrations can be employed.

The benzyl bromoacetate in appropriate concentrations may be added to the mill water at any point in the system from the pulp preparation stages up to machine head box. It will be preferred usually to add the benzyl bromoacetate at the point or points of greatest slime accumulation. In general, areas of maximum slime accumulation will be found at, or just before, the paper making machine. Conveniently, therefore, the benzyl bromoacetate may be added at the fan pump where good mixing is assured, or into the tray white water. The toxicant then is distributed throughout the system by recirculation of the white water to earlier stages. The toxicant may be added either continuously or by intermittent slugging techniques.

Benzyl bromoacetate, being liquid, may be incorporated neat into paper mill water systems by any simple mixing technique which will insure good distribution. Alternatively, however, the benzyl bromoacetate may be added in the form of an adsorbate of benzyl bromoacetate on finely powdered solid dispersants. Typical dispersants which may be employed for this purpose will include, for example, calcium magnesium silicate, silicon dioxide, clays and talcs. From 10 to 50% by weight of benzyl bromoacetate may be adsorbed on such dispersants by thoroughly blending the benzyl bromoacetate and the powdered dispersant in a suitable mill. The adsorbate then may be added to the paper mill water system at any desired point in sufficient quantity to give the desired final concentration of benzyl bromoacetate in the total mill system.

In addition, if desired, the benzyl bromoacetate can be added to the paper mill water system by way of solutions. Benzyl bromoacetate is soluble in many organic solvents such as, for example, xylene, toluene, perchloroethylene, 2-ethoxyethanol, 2-ethoxyethyl acetate, diethyleneglycol monoethyl ether and the like. Solutions of benzyl bromoacetate in organic solvents, which may contain from 1 to 70% of benzyl bromoacetate, can be simply added with agitation into the mill waters to give the desired concentration in the system.

Although benzyl bromoacetate normally will be employed in the control and inhibition of slime formation in paper mill water systems by treating entire mill water system according to the techniques described above, it may be used also to control and inhibit slime formation in localized areas of the mill system. In many mill systems, objectional accumulations of slime occurs only in particular points in the system such as, for example in the stock chests and proportioners in hydropulpers, in the beaters and in the refiners, the remainder of the mill system being relatively free of slime accumulation. Benzyl bromoacetate, in relatively high concentrations, may be added at such points of high slime accumulation in order to control localized problems. Further, benzyl bromoacetate may be added to the mill system as a component of the stock materials (e.g. chemical or groundwood pulps) thus serving not only to control and inhibit slime formation in the mill water system but to preserve the stock materials against bacterial and fungal attack during storage prior to use and to prevent introduction of bacteria and fungi into the mill system through contaminated stock. When used for these purposes, the benzyl bromoacetate usually will employed in concentrations of about 5 to 500 ppm.

The antibacterial and antifungal activity of benzyl bromoacetate against typical bacteria and fungi associated with paper mill slimes is illustrated by the following experiments:

ANTIBACTERIAL ACTIVITY

A stock solution of benzyl bromoacetate was prepared in 25% methanol. Dilutions of this solution were made into Tryptone Glucose Extract Agar (Difco) and the agar was poured into sterile petri dishes. After hardening, the plates were streaked with an aqueous suspension of the test organism. The inoculated plates were incubated at 35°–37° C. and examined after 24 hours for the presence or absence of growth. The lowest concentration at which no growth occurred is reported as the "Total Inhibiting Concentration."

Antifungal Activity

A stock solution of benzyl bromoacetate was prepared in 25% methanol. Dilutions of this solution were made into sabourand Maltose Agar (Difco) and the agar was poured into sterile petri dishes. After hardening, the plates were streaked with an aqueous spore suspension of the test organism. No wetting agent was used in preparation of the suspension. The inoculated plates were incubated at 28°–30° C. and examined after 7 days for the presence or absence of growth. The lowest concentration at which no growth occurred is reported as the "Total Inhibiting Concentration."

The results obtained are set forth below:

ANTIBACTERIAL AND ANTIFUNGAL ACTIVITY OF BENZYL BROMOACETATE

| Test organism | Total inhibiting concentration (ppm) |
|---|---|
| Aerobacter aerogenes IPC 500 | 50 |
| Bacillus mycodies IPC 509 | 10 |
| Pseudomonas aeruginosa ATCC 10145 | 1 |
| Staphylococcus aureus ATCC 6538 | 10 |
| Saccharomyces cerevisiac Isolate | 1 |
| Aspergillus niger ATCC 6275 | 10 |
| Pullulavia pullulans ATCC 9348 | 10 |
| Penicillium luteum ATCC 10466 | 10 |

Test concentrations: 250–100–50–25–10–1–0.1 ppm
IPC—Institute of Paper Chemisty Appleton, Wisconsin
ATCC—American Type Culture Collection Rockville, Maryland Similar results are obtained when organic solvent solutions of benzyl bromoacetate are employed as is illustrated in the following experiments:

Antibacterial Activity

A stock solution of the test formulation (50% benzyl bromoacetate in perchloroethylene) was prepared in 25% methanol. Dilutions of this stock solution were made into Tryptone Glucose Extract Agar (Difco) and the agar was poured into sterile petri dishes. After hardening, the plates were streaked with an aqueous suspension of the test organism. The inoculated plates were incubated at 35°–37° C. and examined after 24 hours for the presence or absence of growth. The lowest concentration at which no growth occurred is reported as the "Total Inhibiting Concentration."

Antifungal Activity

A stock solution of the test formulation (50% benzyl bromoacetate in perchloroethylene) was prepared in 25% methanol. Dilutions of this solution were made into Sabourand Maltose Agar (Difco) and the agar was poured into sterile petri dishes. After hardening the plates were streaked with an aqueous spore suspension of the test organism. The inoculated plates were incubated at 28°–30° C. and examined for the presence or absence of growth after 7 days (the *Saccharomyces cerevisiae* plate only was examined after 24 hours). The lowest concentration at which no growth occurred is reported as the "Total Inhibiting Concentration."

The results obtained are set forth below:

ANTIBACTERIAL AND ANTIFUNGAL ACTIVITY OF BENZYL BROMOACETATE FORMULATION (50% BENZYL BROMOACETATE IN PERCHLOROETHYLENE)

| Test organism | Total inhibiting Concentration (ppm formulation) |
|---|---|
| Aerobacter aerogenes IPC 500 | 75 |
| Bacillus mycoides IPC 509 | 25 |
| Saccharomyces cerevisiac Isolate | 5 |
| Aspergillus niger IPC 144 | 5 |
| Penicillium expansum IPC 126 | ±1 |

±indicates threshold level
Test concentrations: 300–200–100–75–50–25–5–1 ppm
IPC—Institute of Paper Chemistry Appleton, Wisconsin The subject matter which applicant regards as his invention is particularly pointed out and distinctly claimed as follows:

What is claimed is:

1. A method for controlling and inhibiting formation of slime in paper mill white water systems which comprises adding to said paper mill water systems a bactericidally and fungicidally effective amount of benzyl bromoacetate.

2. The method according to claim 1 wherein there is added from 0.1 to 25.0 ppm of benzyl bromoacetate.

3. The method according to claim 2 wherein there is added from 0.1 to 10.0 ppm of benzyl bromoacetate.

4. A slime controlled paper mill white water system containing at least a bactericidally and fungicidally effective quantity of benzyl bromoacetate.

5. The system of claim 4 containing from 0.1 to 25.0 ppm of benzyl bromoacetate.

6. The system of claim 5 containing from 0.1 to 10.0 ppm of benzyl bromoacetate.

* * * * *

UNITED STATES PATENT OFFICE
CERTIFICATE OF CORRECTION

Patent No. 3,658,700　　　　　　　　Dated April 25, 1972

Inventor(s)　Seymour J. Lederer

It is certified that error appears in the above-identified patent and that said Letters Patent are hereby corrected as shown below:

The name of the assignee should appear as follows:

[73] Assignee: MERCK & CO., Inc., Rahway, N.J.

Signed and sealed this 5th day of September 1972.

(SEAL)
Attest:

EDWARD M. FLETCHER, JR.　　　　　　　ROBERT GOTTSCHALK
Attesting Officer　　　　　　　　　　Commissioner of Patents